United States Patent
Ashmore et al.

(10) Patent No.: US 10,196,981 B2
(45) Date of Patent: Feb. 5, 2019

(54) BEARING RACEWAY AND A METHOD OF MANUFACTURING A BEARING

(71) Applicant: ROLLS-ROYCE plc, London (GB)

(72) Inventors: Daren R. Ashmore, Nottingham (GB); James A. Plant, Nottingham (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/432,388

(22) Filed: Feb. 14, 2017

(65) Prior Publication Data
US 2017/0241344 A1 Aug. 24, 2017

(30) Foreign Application Priority Data
Feb. 22, 2016 (GB) .................. 1603001.7

(51) Int. Cl.
*F02C 7/06* (2006.01)
*F01D 25/16* (2006.01)
*F16C 23/08* (2006.01)
*F16C 19/52* (2006.01)

(52) U.S. Cl.
CPC ................ *F02C 7/06* (2013.01); *F01D 25/16* (2013.01); *F16C 19/52* (2013.01); *F16C 23/08* (2013.01); *F05D 2240/50* (2013.01); *F16C 2360/23* (2013.01)

(58) Field of Classification Search
CPC ........ F16C 19/52; F16C 19/522; F16C 23/08; F16C 33/583; F16C 33/585; F16C 2360/23; F05D 2240/50
USPC ........ 384/495, 513, 558, 571, 581, 620, 622
See application file for complete search history.

(56) References Cited

U.S. PATENT DOCUMENTS

| 4,227,753 A | 10/1980 | Wilcock |
| 4,453,783 A * | 6/1984 | Davis .................... F16C 27/045 384/99 |
| 5,073,036 A | 12/1991 | Sutton et al. |

(Continued)

FOREIGN PATENT DOCUMENTS

| CN | 201428738 Y | 3/2010 |
| EP | 0 051 160 A2 | 5/1982 |

(Continued)

OTHER PUBLICATIONS

Jul. 28, 2017 Search Report issued in British Application No. GB1702375.5.

(Continued)

*Primary Examiner* — James Pilkington
(74) *Attorney, Agent, or Firm* — Oliff PLC

(57) ABSTRACT

A component 2 for a bearing, the component 2 comprising a bearing surface 4, wherein the bearing surface 4 is formed so as to be tapered at rest, thereby offsetting deformation of the bearing during an operational condition which generates an induced angle in the bearing surface 4 or an opposing surface of the bearing. A method of manufacturing a bearing is also provided. The method comprises: determining an induced angle of a component 2 of the bearing caused by deformation of the bearing during an operational condition: and providing a surface 4 of the component 2 or an opposing component with a taper at rest so as to offset the induced angle generated during the operational condition.

9 Claims, 3 Drawing Sheets

(56) References Cited

U.S. PATENT DOCUMENTS

| | | | | |
|---|---|---|---|---|
| 5,286,117 A | * | 2/1994 | Wojan | F16C 33/58 |
| | | | | 384/513 |
| 7,537,391 B2 | * | 5/2009 | Smook | F16C 33/583 |
| | | | | 384/513 |
| 8,157,451 B2 | * | 4/2012 | Solfrank | F16C 23/08 |
| | | | | 384/457 |
| 2007/0270228 A1 | | 11/2007 | Araki | |

FOREIGN PATENT DOCUMENTS

| | | |
|---|---|---|
| EP | 0 271 712 A2 | 6/1988 |
| GB | 2121120 A | 12/1983 |
| SU | 765538 A1 | 9/1980 |

OTHER PUBLICATIONS

Jul. 19, 2016 Search Report issued in British Patent Application No. GB1603001.7.

* cited by examiner

BEARING RACEWAY AND A METHOD OF MANUFACTURING A BEARING

TECHNICAL FIELD OF INVENTION

The invention relates to a bearing raceway and a method of manufacturing a bearing.

BACKGROUND OF INVENTION

FIG. 8 shows a ducted fan gas turbine engine 10 comprising in axial flow series: an air intake 12, a propulsive fan 14 having a plurality of fan blades 16, an intermediate pressure compressor 18, a high-pressure compressor 20, a combustor 22, a high-pressure turbine 24, an intermediate pressure turbine 26, a low-pressure turbine 28 and a core exhaust nozzle 30. A nacelle (not shown) generally surrounds the fan casing 32 and engine 10 and defines the intake 12, a bypass duct 34 and a bypass exhaust nozzle. The engine has a principal axis of rotation 31.

Air entering the intake 12 is accelerated by the fan 14 to produce a bypass flow and a core flow. The bypass flow travels down the bypass duct 34 and exits the bypass exhaust nozzle 36 to provide the majority of the propulsive thrust produced by the engine 10. The core flow enters in axial flow series the intermediate pressure compressor 18, high pressure compressor 20 and the combustor 22, where fuel is added to the compressed air and the mixture burnt. The hot combustion products expand through and drive the high, intermediate and low-pressure turbines 24, 26, 28 before being exhausted through the nozzle 30 to provide additional propulsive thrust. The high, intermediate and low-pressure turbines 24, 26, 28 respectively drive the high and intermediate pressure compressors 20, 18 and the fan 14 by concentric interconnecting shafts 38, 40, 42.

As would be expected, bearings are employed throughout the engine to allow various components to rotate. These bearings are designed and made to be able to withstand the operating conditions exerted on them during use. One type of bearing which finds common use is a cylindrical roller bearing which can be used to provide rotational support to the interconnecting shafts.

Cylindrical roller bearing raceways are manufactured with a cylindrical raceway (round and perpendicular to a datum surface) to within a tight tolerance. Typically, for aerospace standard bearings the raceway will have a perpendicularity of the order of 0.005 mm for a raceway diameter of around 200 mm. This geometric control is to ensure a suitable line contact can be achieved between the raceway and the roller. If the raceway is not perpendicular to the roller this can lead to a skewed contact profile which can cause increased contact stress, dynamic instability, cage pocket wear and bearing failure.

To accommodate misalignment, rollers typically have a profile comprising a central flat length, a crowned section (of large radius) to both sides of the flat length, and a small corner radius at both ends of the roller. This profile allows the roller bearing to accommodate misalignment by minimising the increase in contact stress at the edge of the contact patch through gradual relief of the contact across the crowned section of the roller.

Misalignment of a roller bearing can be caused through manufactured geometric tolerances, eccentricity of installation in to a rotor system, and operational conditions.

The operational environment of a bearing may exceed reliable misalignment levels through a combination of rotor geometry, weight distribution, structural deformation, and temperature gradients. If it is not possible to ensure the bearing is operating within reliable levels of misalignment by addressing any of these issues then the bearing is likely to become distressed.

The invention seeks to address these issues by providing a bearing which is able to cope with greater misalignment caused by operational conditions.

STATEMENTS OF INVENTION

The present invention provides a bearing and a method of manufacturing a bearing according to the appended claims.

The present disclosure provides a bearing for a shaft, comprising: a rolling element, an inner or outer race having a bearing surface against which the rolling element rolls in use, wherein the bearing surface includes a taper angle so as to be angled relative to the rotational axis of the shaft at rest, the taper angle being equal to the deformation of the bearing during an operational condition which generates an opposing induced angle in the bearing surface such that the bearing surface is at an angle with respect to the rolling element at rest, and parallel to the bearing surface during the operational condition.

Providing a bearing with an inner or outer race with a taper angle allows the operational induced deformations to be more readily accommodated by the bearing with reduced overall wear.

The bearing may be a cylindrical bearing. The inner or outer race may be pre-coned to provide the taper angle. The bearing surface may have a taper angle of approximately 0.5 to 5.0 mrads.

The inner or outer race may be installed with an interference fit between two mating surfaces. At least one of the mating surfaces of the interference fit may have a profile which causes the component to deform during installation, thereby creating the taper angle in the bearing surface.

The bearing may be a roller or ball bearing. The tapered bearing surface may be angled with respect to an opposing surface of the rolling element at rest and may be brought closer toward being parallel with the opposing surface during the operational condition.

The bearing surface may be parallel to the opposing surface of the rolling element during the operational condition.

The tapered surface may be angled toward the opposing surface at rest and may be parallel with or angled away from the opposing surface during the operational condition.

Also disclosed is a gas turbine engine comprising the bearing. The operational condition may be a cruise condition for the engine.

The present disclosure also provides a method of manufacturing a bearing, the method comprising: determining an induced angle of an inner or outer race of the bearing caused by deformation of the bearing during an operational condition; and providing a hearing surface of the inner or outer race with a taper at rest so as to offset the induced angle generated during the operational condition.

A taper angle of the bearing surface may be selected so as to provide the bearing surface with an operating angle during the operational condition which is within a predetermined misalignment range.

The bearing surface may be provided with a taper by installing the component so that a mating surface of the component abuts against a mating surface of another structure to form an interference fit and wherein at least one of the mating surfaces of the interference fit has a profile which causes the component to deform during installation, thereby creating the tapered bearing surface.

A taper angle of the bearing surface may be selected based on relative times in the operational condition and in a rest condition.

Another aspect of the disclosure provides a component for a bearing, the component comprising a bearing surface, wherein the bearing surface is formed so as to be tapered at rest, thereby offsetting deformation of the bearing during an operational condition which generates an induced angle in the bearing surface or an opposing surface of the bearing.

The component may be installed with an interference fit between two mating surfaces and wherein at least one of the mating surfaces of the interference fit has a profile which causes the component to deform during installation, thereby creating the tapered bearing surface.

The component may be an inner or outer race of a rolling-element bearing.

The component may be a race of a roller or ball bearing. For example, the bearing may be a tapered roller bearing, barrel roller bearing, spherical roller bearing, spherical tapered roller bearing, needle roller bearing or spherical plain journal bearing. The component may also be used with bearings which are not rolling-element bearings, such as a plain journal bearings.

In accordance with another aspect of the invention there is provided a bearing comprising a component as described above.

The tapered bearing surface may be angled with respect to an opposing surface at rest and may be brought closer toward being parallel with the opposing surface during the operational condition.

The tapered bearing surface may be angled toward an opposing surface at rest and may be parallel with or angled away from the opposing surface during the operational condition.

The bearing may be a rolling-element bearing and the component may form an inner and/or outer race of the bearing.

The rolling-element bearing may be a roller bearing, such as a cylindrical roller bearing. Alternatively, the rolling-element bearing may be a ball bearing. The bearing may, for example, be a tapered roller bearing, barrel roller bearing, spherical roller bearing, spherical tapered roller bearing, needle roller bearing or spherical plain journal bearing. The bearing may also be a plain journal bearing which does not include any rolling elements.

In accordance with another aspect of the disclosure there is provided a method of manufacturing a bearing, the method comprising: determining an induced angle of a component of the bearing caused by deformation of the bearing during an operational condition; and providing a bearing surface of the component or an opposing component with a taper at rest so as to offset the induced angle generated during the operational condition.

A taper angle of the bearing surface may be selected so as to provide the bearing surface with an operating angle during the operational condition which is within a predetermined misalignment range.

The bearing surface may be provided with a taper by installing the component so that a mating surface of the component abuts against a mating surface of another structure to form an interference fit and wherein at least one of the mating surfaces of the interference fit has a profile which causes the component to deform during installation, thereby creating the tapered bearing surface.

A taper angle of the bearing surface may be selected based on relative times in the operational condition and in a rest condition.

DESCRIPTION OF DRAWINGS

For a better understanding of the invention, and to show more clearly how it may be carried into effect, reference will now be made, by way of example, to the accompanying drawings, in which.

DETAILED DESCRIPTION

Figure 1:
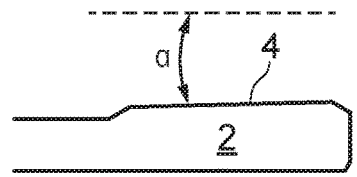
FIG. 1 is a cross-sectional view of a bearing race according to an embodiment of the invention at rest.
Figure 5:
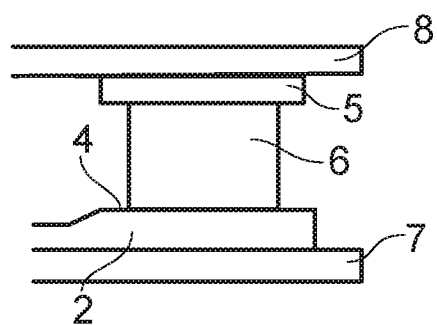
FIG. 5 shows a bearing arrangement having the bearing race of FIGS. 1 and 2.

FIGS. 1 and 5 show a bearing race 2 (component) of a roller bearing. The bearing race 2 is annular and is arranged concentrically with a further bearing race 5 having a different diameter to that of the bearing race 2 to form inner and outer races. Rollers 6, which may be cylindrical, are disposed between the inner and outer races of the bearing to permit relative rotation between the inner and outer races. The inner and outer races are mounted on to or within a supporting structure such as a housing 7, or a shaft 8. It will be appreciated that the bearing arrangement may also include other parts such as a bearing cage or the like, The bearing race 2 comprises a raceway 4 (bearing surface) which contacts the rollers. The raceway 4 is therefore either an inner surface of the outer race or an outer surface of the inner race.

The raceway 4 is tapered at an angle $\alpha$ such that the raceway 4 is inclined toward an axis of rotation of the bearing race 2 when at rest, as is shown in FIG. 1.

Figure 2:
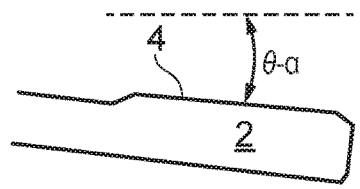
FIG. 2 shows the bearing race of FIG. 1 during an operational condition.

As shown in FIG. 2, during operation of the bearing, the bearing race 2 may deform as a result of operational conditions, such as speed, load and temperature. As shown in FIG. 2, the deformation of the bearing race 2 creates an induced angle $\theta$ at the raceway 4. The taper angle $\alpha$ of the raceway 4 opposes and thus offsets deformation of the bearing race 2 during the operational condition. Consequently, during the operational condition, the raceway 4 has an operating angle which is equal to the induced angle $\theta$ minus the taper angle $\alpha$ ($=\theta-\alpha$).

The taper angle $\alpha$ of the raceway 4 thus limits the misalignment between the rollers and the raceway 4 during operation.

The taper angle $\alpha$ of the raceway 4 causes misalignment during start-up (before the bearing is rotating at operational speed) and so the taper angle $\alpha$ is selected so as to balance the level of misalignment and the relative time spent under the start-up condition and the operational condition.

The taper angle $\alpha$ of the raceway 4 may be formed during manufacture of the race 2 itself, such as during a machining process.

Figure 6:
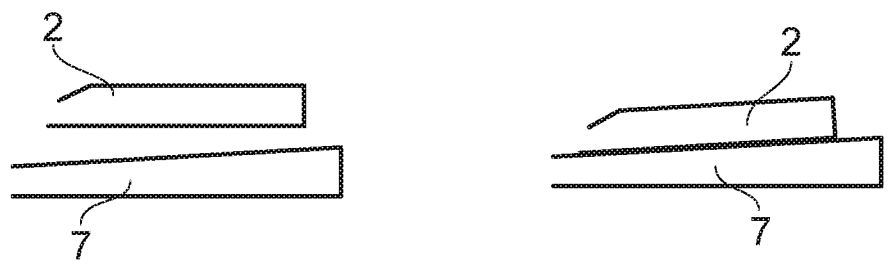
FIG. 6 shows a bearing race which is tapered on installation.
Figure 7:
FIG. 7 shows an alternative arrangement to that shown in FIG. 6.
Figure 8:
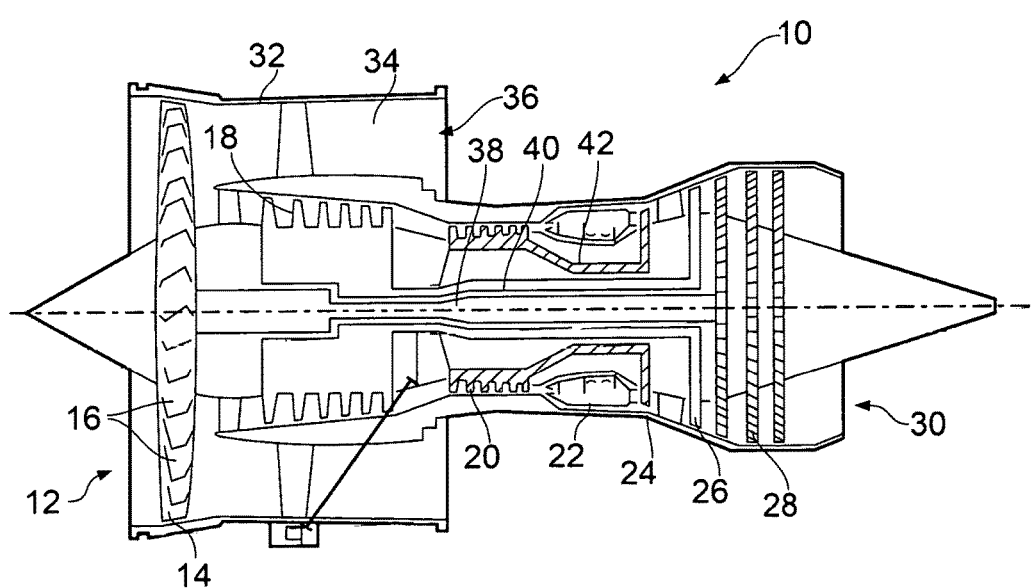
FIG. 8 shows a conventional gas turbine engine.

Alternatively, as shown in FIGS. 6 and 7, the taper angle α may be generated during installation of the race 2. For example, where the race 2 is a discrete component which is fitted with an interference on to a shaft or housing structure 7, the taper angle α may be generated by providing a tapered profile on either of the mating surfaces. For the inner race, the tapered profile may be provided on an inner surface of the inner race or an outer surface of the shaft. Similarly, for the outer race, the tapered profile may be provided on an inner surface of the housing 7 (FIG. 6) or an outer surface 9 of the outer race (FIG. 7). FIGS. 6 and 7 show the pre- and post-installed on left and right respectively.

The tapered profile of the mating surface causes the race 2 to deform as it is forced onto the shaft or housing, thereby generating the required taper angle α at the raceway 4. The resulting taper angle α is dependent on the relative stiffness of the mating components which therefore must be taken into account when determining the required profile of the mating surface.

Figure 3:
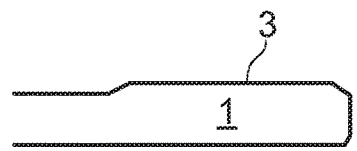
FIG. 3 is a cross-section view of a prior art bearing race at rest.
Figure 4:
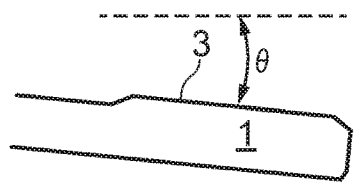
FIG. 4 shows the bearing race of FIG. 3 during an operational condition.

By way of contrast, FIGS. 3 and 4 show a prior art bearing race 1 that has a raceway 3 which, unlike the raceway 4 of the invention, is not tapered. Accordingly, the raceway 3 is parallel to the axis of rotation when the bearing is at rest, as shown in FIG. 3. Consequently, any deformation of the bearing race 1 during the operational condition increases the operating angle of the raceway 3. The operating angle is thus equal to the induced angle θ. In extreme operating conditions, the induced angle θ may exceed the acceptable level of misalignment causing premature bearing distress.

As can be seen, the tapered raceway 4 of the invention acts to offset deformation of the race 2 during use. Therefore, at least the initial deformation of the race 2 actually acts to improve the alignment (i.e. reduce the misalignment) of the race 2 and the roller. The tapered raceway 4 is thus able to reduce misalignment during the operational condition to acceptable levels, thereby improving reliability and prolonging the life of the bearing. This is particularly beneficial where the induced angle θ exceeds a predetermined misalignment tolerance of the bearing. It will be appreciated that the operational angle of the raceway may be any desired but will preferably be parallel. This is not the case shown in FIG. 2, which has an exaggerated angle to make the effect clear.

The tapered raceway 4 does not compromise the surrounding architecture and rotor geometry which would otherwise have to be modified to reduce the bearing misalignment.

The raceway of one or both of the inner and outer races may be tapered, as described previously. Where both the inner and outer races are provided with a tapered raceway, they may taper in the same or opposing directions, depending on the nature of the deformation encountered by the respective race. A tapered raceway may also be used to offset deformation of an opposing race.

The raceway of the inner or outer race may be provided with a pair of guide ribs to maintain the axial location of the rollers as they rotate around the bearing. The guide ribs may also be angled so that they are perpendicular to the tapered surface of the raceway.

Although the operating angle of the raceway 4 has been shown as being angled away from the axis of rotation of the race 2, it will be appreciated that the taper angle α may be set such that the operating angle is in fact parallel to the axis. This may be appropriate where the race 2 reaches the operating angle very quickly and so very little time is spent in the start-up condition.

Although the invention has been described with reference to a roller bearing, it will be appreciated that the invention may be employed with other bearings, particularly ball bearings. The bearing may, for example, be a tapered roller bearing, barrel roller bearing, spherical roller bearing, spherical tapered roller bearing, needle roller bearing or spherical plain journal bearing. The invention may also be employed with other bearings which do not have rolling elements, such as plain journal bearings.

The invention is not limited to the embodiments described herein, and may be modified or adapted without departing from the scope of the present invention.

The invention claimed is:

1. A bearing for a shaft, comprising:
    a rolling element,
    an inner or outer race having a bearing surface against which the rolling element rolls in use,
    wherein the bearing surface includes a taper angle so as to be angled relative to the rotational axis of the shaft at rest, the taper angle being equal to the deformation of the bearing during an operational condition which generates an opposing induced angle in the bearing surface such that the bearing surface is at an angle with respect to the rolling element at rest, and parallel to the rolling element during the operational condition, and
    wherein the inner or outer race is installed with an interference fit between two surfaces and wherein at least one of the surfaces of the interference fit has a profile which causes the component to deform during installation, thereby creating the taper angle in the bearing surface.

2. A bearing as claimed in claim 1, wherein the bearing surface has a taper angle of approximately 0.5 to 5.0 mrads.

3. A bearing as claimed in claim 1, wherein the rolling element is a roller or ball bearing.

4. A bearing as claimed in claim 1, wherein the bearing surface is parallel to an opposing surface of the rolling element during the operational condition.

5. A bearing as claimed in claim 1, wherein the bearing surface is angled toward an opposing surface of the rolling element at rest and is parallel with the opposing surface during the operational condition.

6. A gas turbine engine comprising the bearing as claimed in claim 1 wherein the operational condition is a cruise condition for the engine.

7. A method of manufacturing a bearing, the method comprising:
    determining an induced angle of an inner or outer race of the bearing caused by deformation of the bearing during an operational condition; and
    providing a bearing surface of the inner or outer race with a taper at rest so as to offset the induced angle generated during the operational condition,
    wherein the bearing surface is provided with a taper by installing a component so that a surface of the component abuts against a surface of another structure to form an interference fit and wherein at least one of the surfaces of the interference fit has a profile which causes the component to deform during installation, thereby creating the tapered bearing surface.

8. A method of manufacturing a bearing as claimed in claim 7, wherein a taper angle of the bearing surface is selected so as to provide the bearing surface with an operating angle during the operational condition which is within a predetermined misalignment range.

9. A method of manufacturing a bearing as claimed in claim 7, wherein a taper angle of the bearing surface is selected based on time spent in the operational condition relative to time spent in a rest condition.

* * * * *